(12) United States Patent
Zhang et al.

(10) Patent No.: US 11,283,569 B2
(45) Date of Patent: Mar. 22, 2022

(54) DATA TRANSMISSION METHOD, NETWORK DEVICE, AND TERMINAL DEVICE

(71) Applicant: Huawei Technologies Co., Ltd., Shenzhen (CN)

(72) Inventors: Ruiqi Zhang, Beijing (CN); Jianqin Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 26 days.

(21) Appl. No.: 16/788,007

(22) Filed: Feb. 11, 2020

(65) Prior Publication Data

US 2020/0177338 A1 Jun. 4, 2020

Related U.S. Application Data

(63) Continuation of application No. PCT/CN2018/098919, filed on Aug. 6, 2018.

(30) Foreign Application Priority Data

Aug. 11, 2017 (CN) .......................... 201710687724.1

(51) Int. Cl.
*H04L 5/00* (2006.01)

(52) U.S. Cl.
CPC .......... *H04L 5/0048* (2013.01); *H04L 5/0007* (2013.01)

(58) Field of Classification Search
CPC ... H04L 5/0023; H04L 5/0048; H04L 5/0035; H04L 5/0051; H04W 72/042; H04W 76/27; H04W 48/12; H04B 7/0413
See application file for complete search history.

(56) References Cited

U.S. PATENT DOCUMENTS

2011/0103324 A1 5/2011 Nam et al.
2013/0121273 A1 5/2013 Kim et al.
(Continued)

FOREIGN PATENT DOCUMENTS

CN 102202027 A 9/2011
CN 102598526 A 7/2012
(Continued)

OTHER PUBLICATIONS

"On the remaining details of DM-RS design," 3GPP TSG RAN WG1 NR Ad-HOC#2, Qingdao, P.R. China, R1-1710534, XP051299741, total 4 pages, 3rd Generation Partnership Project, Valbonne, France (Jun. 26, 2017).

*Primary Examiner* — David S Huang
(74) *Attorney, Agent, or Firm* — Leydig, Voit & Mayer, Ltd.

(57) ABSTRACT

This application provides a data transmission method, a network device, and a terminal device. The method includes: generating, by the network device, first information, where a value of a bit included in the first information is used to indicate a demodulation reference symbol (DMRS) port combination in a second set, each DMRS port combination in the second set belongs to a first set, the first set includes a plurality of DMRS port combinations, the DMRS port combination includes at least one DMRS port, and a quantity of DMRS port combinations included in the second set is less than a quantity of DMRS port combinations included in the first set; and sending, by the network device, the first information to the terminal device. According to embodiments of this application, signaling overheads can be reduced.

19 Claims, 6 Drawing Sheets

(56) References Cited

U.S. PATENT DOCUMENTS

2015/0334683 A1* 11/2015 Guo .................... H04W 72/042
370/329
2019/0013910 A1 1/2019 Zhang et al.
2020/0178281 A1* 6/2020 Bhamri ............... H04L 27/2607

FOREIGN PATENT DOCUMENTS

CN 106470088 A 3/2017
KR 20110085878 A 7/2011

* cited by examiner

DATA TRANSMISSION METHOD, NETWORK DEVICE, AND TERMINAL DEVICE

CROSS-REFERENCE TO RELATED APPLICATIONS

This application is a continuation of International Application No. PCT/CN2018/098919, filed on Aug. 6, 2018, which claims priority to Chinese Patent Application No. 201710687724.1, filed on Aug. 11, 2017. The disclosures of the aforementioned applications are hereby incorporated by reference in their entireties.

TECHNICAL FIELD

This application relates to the communications field, and more specifically, to a data transmission method, a network device, and a terminal device.

BACKGROUND

A multiple-input multiple-output (MIMO) technology is widely used in a long term evolution (LTE) system. A relatively high data transmission rate can be provided in a MIMO transmission mode in which multi-layer parallel transmission is used, and a quantity of parallel transmission layers that may be used is related to a channel between a network device and a terminal device.

In LTE standard version 9/10 (Rel. 9/10), data transmission with a maximum of eight layers is stipulated. Correspondingly, a maximum quantity of demodulation reference symbol (DMRS) ports is eight. The network device sends downlink control information through a downlink control channel, and the downlink control information includes a DMRS port indication field, which is used to indicate a quantity of downlink data transmission layers and a DMRS port number that is used.

Currently, in the prior art, dynamic signaling is used to indicate each state, but in this case, a relatively large quantity of bits need to be occupied, so that resource overheads are relatively high. Therefore, a solution urgently needs to be provided to reduce the resource overheads.

SUMMARY

This application provides a data transmission method, a network device, and a terminal device, to avoid a case in which bits are occupied to indicate some improper DMRS port combinations, thereby reducing signaling overheads.

According to a first aspect, a data transmission method is provided, and includes: generating, by a network device, first information, where a value of a bit included in the first information is used to indicate a DMRS port combination in a second set, each DMRS port combination in the second set belongs to a first set, the first set includes a plurality of DMRS port combinations, the DMRS port combination includes at least one DMRS port, and a quantity of DMRS port combinations included in the second set is less than a quantity of DMRS port combinations included in the first set; and sending, by the network device, the first information to a terminal device.

In an embodiment of this application, the network device generates the first information, and the value of the bit included in the first information is used to indicate the DMRS port combination in the second set. Because a quantity of bits occupied by the first information can indicate each DMRS port combination included in the second set, compared with that the first information is used to indicate a quantity of bits occupied by each DMRS port combination included in the first set, resource overheads are reduced.

In some possible implementations, before the sending, by the network device, the first information to a terminal device, the method further includes: sending, by the network device, second information to the terminal device, where the second information is used for the terminal device to determine all DMRS port combinations included in the second set.

The network device may further send the second information to the terminal device, so that the terminal device determines, based on the second information, all the DMRS port combinations included in the second set, thereby improving flexibility of determining the second set.

In some possible implementations, the second information includes at least one bit, and a first bit value of each bit in the at least one bit is used to indicate that at least two DMRS port combinations in the first set belong to the second set.

The network device may indicate, by using a bit value of each bit in the at least one bit included in the second information, whether the at least two DMRS port combinations in the first set belong to the second set, so that signaling that is used to indicate the second set is relatively less.

In some possible implementations, each DMRS port combination in the at least two DMRS port combinations indicates that time-frequency resource locations occupied by DMRSs are the same, frequency-domain orthogonal codes occupied by DMRSs are the same, or time-domain orthogonal codes occupied by DMRSs are the same.

In this application, the foregoing implementations are proposed, thereby improving flexibility of indicating the DMRS port combination included in the second set.

In some possible implementations, the second information includes at least one bit, and each bit in the at least one bit is corresponding to one DMRS port combination in the first set; and the first bit value of each bit is used to indicate that the DMRS port combination corresponding to each bit belongs to the second set.

Each bit in the at least one bit included in the second information is used to indicate whether a corresponding DMRS port combination belongs to the second set. This improves flexibility of the DMRS port combination included in the second set.

In some possible implementations, the value of the bit included in the first information includes two bit values indicating a same first DMRS port combination, and the first DMRS port combination indicates a first time-frequency resource location; a first bit value in the two bit values further indicates that some or all time-frequency resources other than the first time-frequency resource location in a second time-frequency resource are used for the terminal device to transmit data, and a second bit value in the two bit values further indicates that some or all time-frequency resources other than the first time-frequency resource location in the second time-frequency resource are not used for the terminal device to transmit data; and a frequency domain resource of the second time-frequency resource is bandwidth allocated by the network device to the terminal device, and a time domain resource of the second time-frequency resource is a time unit occupied by the DMRS.

The DMRS port combination may be further used to indicate whether a time-frequency resource is used for data transmission. This avoids a case in which a dedicated signaling is needed for indication, and reduces signaling overheads.

In some possible implementations, the DMRS port is used to indicate a frequency domain resource location and the frequency-domain orthogonal code that are occupied by the DMRS, or indicates a frequency domain resource location, the frequency-domain orthogonal code, and the time-domain orthogonal code that are occupied by the DMRS.

According to a second aspect, a data transmission method is provided, and includes: receiving, by a terminal device, first information, where a value of a bit included in the first information is used to indicate a demodulation reference symbol DMRS port combination in a second set, each DMRS port combination in the second set belongs to a first set, the first set includes a plurality of DMRS port combinations, the DMRS port combination includes at least one DMRS port, and a quantity of DMRS port combinations included in the second set is less than a quantity of DMRS port combinations included in the first set; and determining, by the terminal device, a first DMRS port combination in the second set based on the first information.

In an embodiment of this application, the terminal device can obtain the first DMRS port combination in the second set based on the first information, to send data based on the first DMRS port combination. Because a quantity of bits occupied by the first information can indicate each DMRS port combination included in the second set, compared with that the first information is used to indicate a quantity of bits occupied by each DMRS port combination included in the first set, resource overheads are reduced.

In some possible implementations, before the receiving, by a terminal device, first information, the method further includes: receiving, by the terminal device, second information, where the second information is used for the terminal device to determine all DMRS port combinations included in the second set.

In some possible implementations, the second information includes at least one bit, and a first bit value of each bit in the at least one bit is used to indicate that at least two DMRS port combinations in the first set belong to the second set.

The terminal device may further receive the second information sent by a network device, and determine, based on the second information, all the DMRS port combinations included in the second set, thereby improving flexibility of determining the second set.

In some possible implementations, each DMRS port combination in the at least two DMRS port combinations indicates that time-frequency resource locations occupied by DMRSs are the same, frequency-domain orthogonal codes occupied by DMRSs are the same, or time-domain orthogonal codes occupied by DMRSs are the same.

A bit value of each bit in the at least one bit included in the second information may be further used to indicate whether the at least two DMRS port combinations in the first set belong to the second set, so that signaling that is used to indicate the second set is relatively less.

In some possible implementations, the second information includes the at least one bit, and each bit in the at least one bit is corresponding to one DMRS port combination in the first set; and the first bit value of each bit is used to indicate that the DMRS port combination corresponding to each bit belongs to the second set.

In this application, the foregoing implementations are proposed, thereby improving flexibility of indicating the DMRS port combination included in the second set.

In some possible implementations, the value of the bit included in the first information includes two bit values indicating a same first DMRS port combination, and the first DMRS port combination indicates a first time-frequency resource location; a first bit value in the two bit values further indicates that some or all time-frequency resources other than the first time-frequency resource location in a second time-frequency resource are used for the terminal device to transmit data, and a second bit value in the two bit values further indicates that some or all time-frequency resources other than the first time-frequency resource location in the second time-frequency resource are not used for the terminal device to transmit data; and a frequency domain resource of the second time-frequency resource is bandwidth allocated by the network device to the terminal device, and a time domain resource of the second time-frequency resource is a time unit occupied by the DMRS.

Each bit in the at least one bit included in the second information is used to indicate whether a corresponding DMRS port combination belongs to the second set. This improves flexibility of the DMRS port combination included in the second set.

In some possible implementations, the DMRS port is used to indicate a frequency domain resource location and the frequency-domain orthogonal code that are occupied by the DMRS, or indicates a frequency domain resource location, the frequency-domain orthogonal code, and the time-domain orthogonal code that are occupied by the DMRS.

According to a third aspect, a network device is provided. The network device includes a module configured to perform the method according to the first aspect or any possible implementation of the first aspect.

According to a fourth aspect, a terminal device is provided. The terminal device includes a module configured to perform the method according to the second aspect or any possible implementation of the second aspect.

According to a fifth aspect, a communications system is provided. The communications system includes:
the network device according to the third aspect and the terminal device according to the fourth aspect.

According to a sixth aspect, a network device is provided, and includes a processor, a memory, and a communications interface. The processor is connected to the memory and the communications interface. The memory is configured to store an instruction. The processor is configured to execute the instruction. The communications interface is configured to communicate with another network element under control of the processor. When the processor executes the instruction stored in the memory, the execution enables the processor to perform the method according to the first aspect or any possible implementation of the first aspect.

According to a seventh aspect, a terminal device is provided, including a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the execution enables the processor to perform the method according to the second aspect or any possible implementation of the second aspect.

According to an eighth aspect, a computer storage medium is provided. The computer storage medium stores program code, and the program code is used to execute an instruction for the method according to the first aspect or any one of the possible implementations of the first aspect.

According to a ninth aspect, a computer storage medium is provided. The computer storage medium stores program code, and the program code is used to execute an instruction for the method according to the second aspect or any one of the possible implementations of the second aspect.

According to a tenth aspect, a system chip is provided. The system chip includes an input/output interface, at least one processor, at least one memory, and a bus. The at least one memory is configured to store an instruction, and the at least one processor is configured to invoke the instruction in the at least one memory, to perform operations in the methods according to the foregoing aspects.

Based on the foregoing solutions, the network device generates the first information, and the value of the bit included in the first information is used to indicate the DMRS port combination in the second set. Because the quantity of bits occupied by the first information can indicate each DMRS port combination included in the second set, compared with that the first information is used to indicate the quantity of bits occupied by each DMRS port combination included in the first set, the resource overheads are reduced.

DESCRIPTION OF EMBODIMENTS

The following describes technical solutions in this application with reference to accompanying drawings.

The technical solutions of the embodiments of this application may be applied to various communications systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD), a universal mobile telecommunications system (UMTS), a worldwide interoperability for microwave access (WiMAX) communications system, a future fifth generation (, 5G) system, or a new radio (NR) system.

A terminal device in the embodiments of this application may be referred to as user equipment, an access terminal, a subscriber unit, a subscriber station, a mobile station, a mobile station, a remote station, a remote terminal, a mobile device, a user terminal, a terminal, a wireless communications device, a user agent, a user apparatus, or the like. The terminal device may be further a cellular phone, a cordless phone, a session initiation protocol SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application.

A network device in the embodiments of this application may be a device configured to communicate with the terminal device. The network device may be a base transceiver station (BTS) in the global system for mobile communications (GSM) or code division multiple access (CDMA), or may be a base station (NB) in the wideband code division multiple access (WCDMA) system, or may be an evolved NodeB (Evolutional NodeB, eNB or eNodeB) in an LTE system, or may be a radio controller in a cloud radio access network (CRAN) scenario. Alternatively, the network device may be a relay station, an access point, a vehicle-mounted device, a wearable device, or a network device in the future 5G network, or a network device in the future evolved PLMN network. This is not limited in the embodiments of this application.

Figure 1:
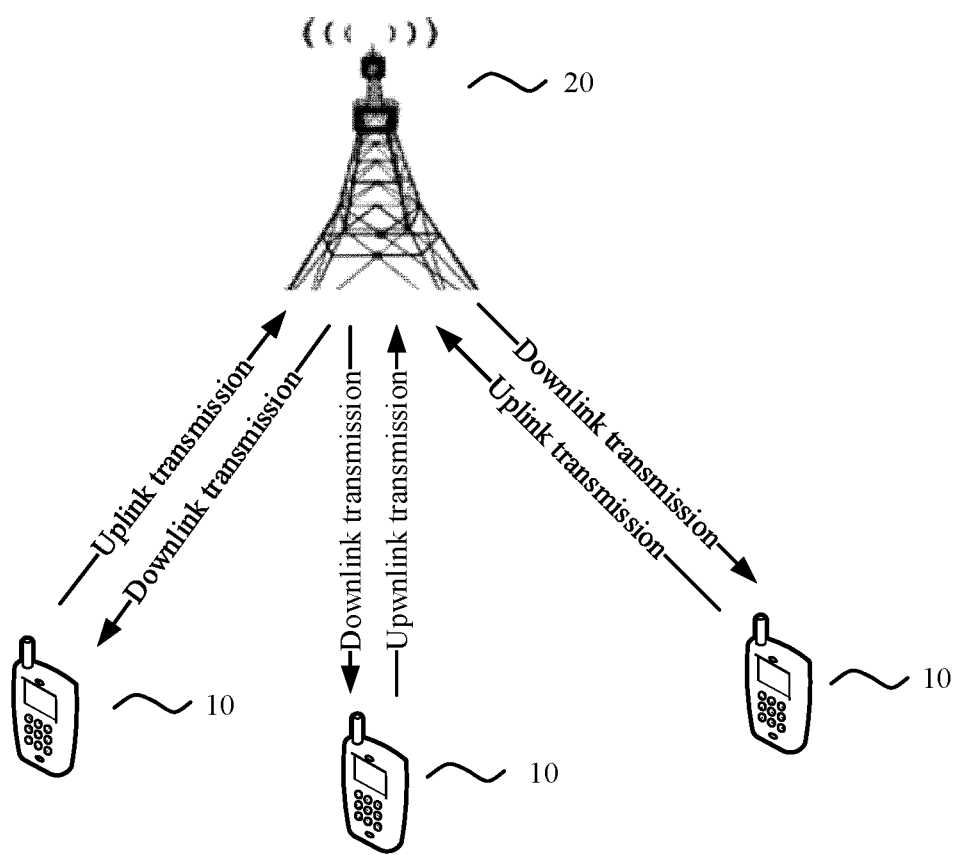
FIG. 1 is a schematic diagram of an application scenario according to this application.

FIG. 1 is a schematic diagram of an application scenario according to this application. A communications system in FIG. 1 may include user equipment 10 and a network device 20. The network device 20 is configured to provide a communications service for the user equipment 10 and access a core network. The user equipment 10 accesses a network by searching for a synchronization signal, a broadcast signal, or the like sent by the network device 20, to communicate with the network. Arrows shown in FIG. 1 may represent uplink/downlink transmission performed by using a cellular link between the user equipment 10 and the network device 20.

A multiple-input multiple-output (Multiple Input and Multiple Output, MIMO) technology is widely used in a long term evolution (LTE) system. A relatively high data transmission rate can be provided in a MIMO transmission mode in which multi-layer parallel transmission is used, and a quantity of parallel transmission layers that may be used is related to a channel between a network device and a terminal device.

In LTE standard release 9/10 (Rel. 9/10), data transmission with a maximum of eight layers is stipulated. Correspondingly, a maximum quantity of DMRS ports is eight. The network device sends downlink control information through a downlink control channel, and the downlink control information includes a DMRS port indication field, and is used to indicate a quantity of downlink data transmission layers and a DMRS port number that is used. For example, the DMRS port indication field includes three bits, and port numbers used by DMRS ports range from 7 to 14. A correspondence between a decimal value represented by the field and DMRS port information is shown in Table 1.

TABLE 1

| | One codeword | | Two codewords |
| --- | --- | --- | --- |
| Bit value | DMRS port information | Bit value | DMRS port information |
| 0 | 1 layer, port 7, nSCID = 0 | 0 | 2 layer, port 7, nSCID = 0 |
| 1 | 1 layer, port 7, nSCID = 1 | 1 | 2 layer, port 7, nSCID = 1 |
| 2 | 1 layer, port 8, nSCID = 0 | 2 | 3 layer, port 7-9 |
| 3 | 1 layer, port 8, nSCID = 1 | 3 | 4 layer, port 7-10 |
| 4 | 2 layers, ports 7-8 | 4 | 2 layers, ports 7-11 |
| 5 | 3 layers, ports 7-9 | 5 | 3 layers, ports 7-12 |
| 6 | 4 layers, ports 7-10 | 6 | 4 layers, ports 7-13 |
| 7 | Reserved | 7 | 4 layers, ports 7-14 |

In NR, a maximum quantity of DMRS ports that may be configured by a network device is 8 or 10, and there are a maximum of eight data layers for parallel transmission on a physical downlink shared channel (PDSCH) for each user. The network device sends dynamic signaling to a terminal device to indicate a quantity of data layers on the PDSCH and a DMRS port number. The more antenna ports configured for the network device and the terminal device, the more advantageous the multi-layer parallel transmission in the MIMO is.

The eight data layers refer to a quantity of layers of data that can be transmitted by the network device on a same time-frequency resource. For multiple users (MU), the eight data layers are a maximum quantity of data layers for each user of the multiple users.

For example, the maximum quantity of DMRS ports is 8, DMRS port numbers range from 0 to 7, a maximum quantity of data layers on the PDSCH is 8, the quantity of data layers is corresponding to a rank, and a DMRS port combination manner is shown in Table 2.

TABLE 2

| | Rank 1 | Rank 2 | Rank 3 | Rank 4 | Rank 5 | Rank 6 | Rank 7 | Rank 8 |
| --- | --- | --- | --- | --- | --- | --- | --- | --- |
| 0 | (0, 1) | (0, 1, 2) | (0, 1, 2, 3) | (0, 1, 2, 3, 4) | (0, 1, 2, 3, 4, 5) | (0, 1, 2, 4, 5, 6) | (0, 1, 2, 3, 4, 5, 6) | (0, 1, 2, 3, 4, 5, 6, 7) |
| 1 | (2, 3) | (4, 5, 6) | (4, 5, 6, 7) | (0, 4, 5, 6, 7) | (0, 1, 4, 5, 6, 7) | (1, 2, 3, 4, 5, 6, 7) | | |
| 2 | (4, 5) | (0, 2, 3) | (0, 2, 4, 6) | (0, 1, 4, 5, 6) | . . . | . . . | | |
| 3 | (6, 7) | (4, 6, 7) | (1, 3, 5, 7) | (4, 5, 0, 1, 2) | | | | |
| 4 | (0, 2) | (0, 2, 4) | (0, 1, 4, 5) | . . . | | | | |
| 5 | (4, 6) | (1, 3, 5) | (2, 3, 6, 7) | | | | | |
| 6 | (1, 3) | (4, 6, 0) | . . . | | | | | |
| 7 | (5, 7) | (5, 7, 1) | | | | | | |
| | (0, 4) | . . . | | | | | | |
| | . . . | | | | | | | |

The network device notifies each state in Table 2 by using the dynamic signaling, but in this case, a large quantity of bits need to be occupied, so that resource overheads are relatively high.

Figure 2:
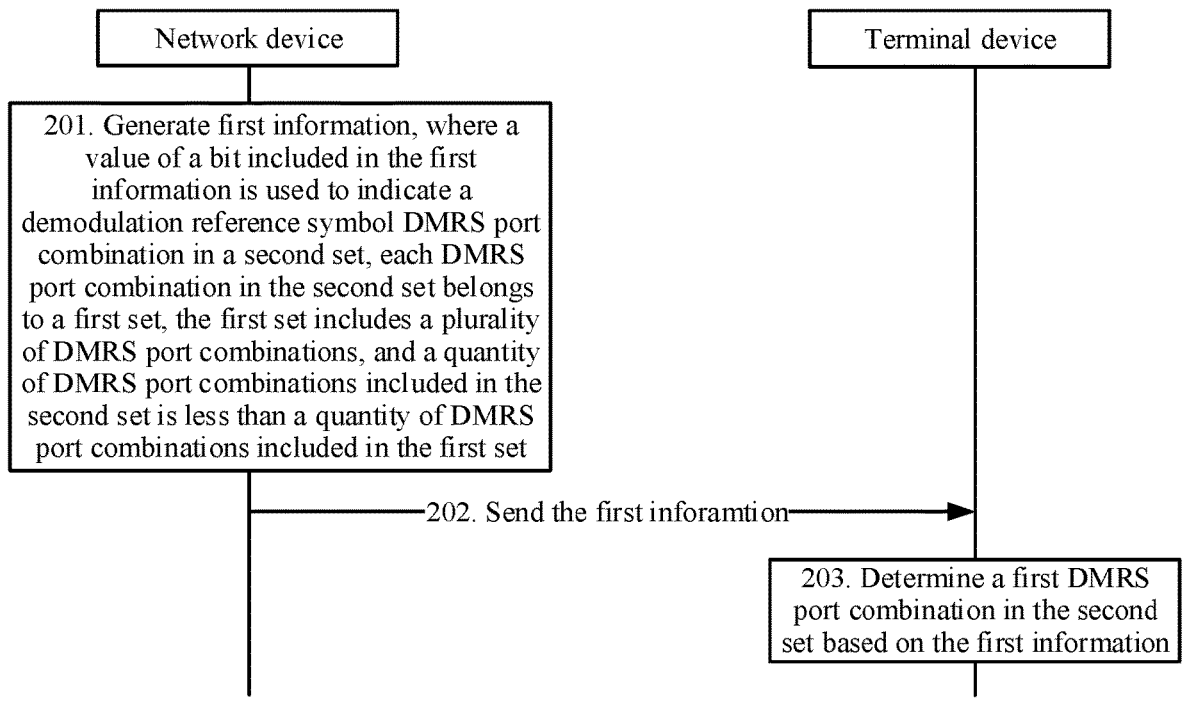
FIG. 2 is a schematic flowchart of a data transmission method according to an embodiment of this application.

FIG. 2 is a schematic flowchart of a data transmission method according to an embodiment of this application.

201. A network device generates first information, where a value of a bit included in the first information is used to indicate a demodulation reference symbol DMRS port combination in the second set, each DMRS port combination in the second set belongs to a first set, the first set includes a plurality of DMRS port combinations, and a quantity of DMRS port combinations included in the second set is less than a quantity of DMRS port combinations included in the first set.

The first set includes the plurality of DMRS port combinations, and the second set includes a part of DMRS port combinations selected from the first set.

It should be noted that the DMRS port combination may include at least one DMRS port.

Optionally, this embodiment of this application may be applied to a system in which a maximum of M DMRS ports are supported, and the first set includes all DMRS port combinations for the system that can serve a maximum of N data streams, where M>N, and M and N each are an integer greater than or equal to 1.

In other words, the quantity of DMRS port combinations included in the first set is related to a quantity of DMRS ports supported in the system and a maximum quantity of data streams that can be served in the system. To be specific, the DMRS port combination may include $2^N-1$, for example, as shown in Table 2.

It should be understood that, in this embodiment of this application, the data layer and the data stream are in a one-to-one correspondence, and the data layer and the rank are in a one-to-one correspondence.

Optionally, the first set may alternatively include a part of DMRS ports in all the DMRS port combinations for the system that can support a maximum of M DMRS ports and that can serve a maximum of N data streams.

Optionally, a DMRS in this embodiment of this application may be a DMRS in the NR.

Specifically, in the NR, the DMRS needs to be front loaded (front loaded). To be specific, the DMRS needs to be located on first several symbols in a downlink subframe (for example, a physical downlink shared channel (PDSCH) data subframe). To meet a requirement of being adapt to different signal-to-noise ratios and different quantities of ports, it is stipulated in the NR that when the DMRS is front loaded, the DMRS may occupy one OFDM symbol or two OFDM symbols. Therefore, the first set in this embodiment of this application may include DMRS port combinations shown in Table 3.

It should be understood that, to adapt to a high-speed moving user, in addition to the front loaded DMRS, an additional DMRS symbol may be configured, and this is not limited in this application. For ease of description, the front loaded DMRS is used as an example for description in the following embodiment.

TABLE 3

| | | Rank 1 | Rank 2 | Rank 3 | Rank 4 | Rank 5 | Rank 6 | Rank 7 | Rank 8 |
| --- | --- | --- | --- | --- | --- | --- | --- | --- | --- |
| One OFDM symbol | 0 | (0, 1) | (0, 1, 2) | (0, 1, 2, 3) | | | | | |
| | 1 | (2, 3) | (0, 1, 3) | | | | | | |
| | 2 | (0, 2) | (0, 2, 3) | | | | | | |
| | 3 | (1, 3) | (1, 2, 3) | | | | | | |
| Two OFDM symbols | 0 | (0, 1) | (0, 1, 2) | (0, 1, 2, 3) | (0, 1, 2, 3, 4) | (0, 1, 2, 3, 4, 5) | (0, . . . , 6) | (0, . . . , 7) | |
| | 1 | (2, 3) | (4, 5, 6) | (4, 5, 6, 7) | (0, 4, 5, 6, 7) | (0, 1, 4, 5, 6, 7) | (1, . . . , 7) | | |
| | 2 | (4, 5) | (0, 2, 3) | (0, 2, 4, 6) | (0, 1, 4, 5, 6) | . . . | . . . | | |
| | 3 | (6, 7) | (4, 6, 7) | (1, 3, 5, 7) | (4, 5, 0, 1, 2) | | | | |
| | 4 | (0, 2) | (0, 2, 4) | (0, 1, 4, 5) | . . . | | | | |

TABLE 3-continued

| Rank 1 | Rank 2 | Rank 3 | Rank 4 | Rank 5 | Rank 6 | Rank 7 | Rank 8 |
|---|---|---|---|---|---|---|---|
| 5 | (4, 6) | (1, 3, 5) | (2, 3, 6, 7) | | | | |
| 6 | (1, 3) | (4, 6, 0) | . . . | | | | |
| 7 | (5, 7) | (5, 7, 1) | | | | | |
| | (0, 4) | . . . | | | | | |
| | (1, 5) | | | | | | |
| | (2, 6) | | | | | | |
| | (3, 7) | | | | | | |
| | . . . | | | | | | |

It should be noted that, in this embodiment of this application, a DMRS port may be identified by using a DMRS port number. For example, numbers 0 to 7 are used to identify different DMRS ports in Table 3.

Optionally, in Table 3, when the DMRS occupies one OFDM symbol, DMRS port combinations corresponding to the rank 2 may further include (0, 3) and (1, 2). For ease of description, only some DMRS port combinations are shown in this embodiment of this application.

Optionally, when the DMRS occupies one OFDM symbol, DMRS port combinations corresponding to the rank 2 may alternatively include only the DMRS port combinations shown in Table 3. For example, the DMRS port combination (0, 3) or (1, 2) cannot be applied to data transmission, and the like.

Optionally, a resource occupation pattern of the DMRS in this embodiment of this application may be a DMRS pattern in the NR.

Figure 3:
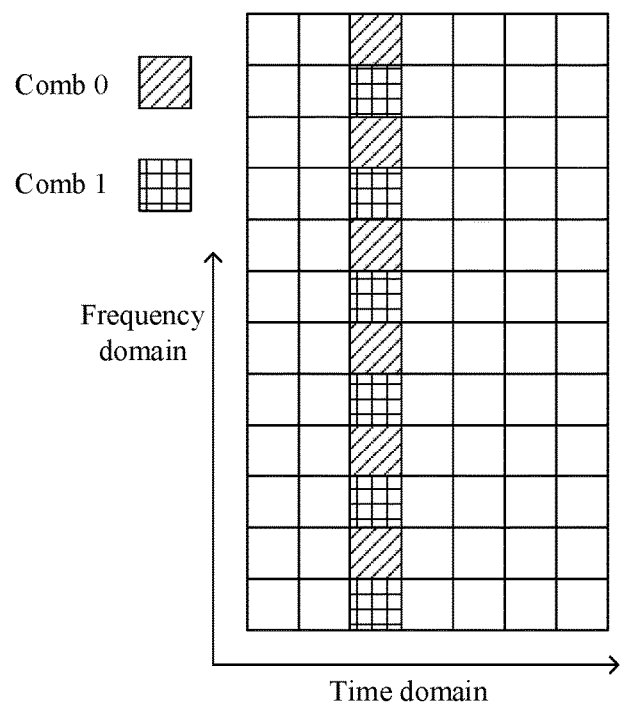
FIG. 3 is a schematic diagram of a DMRS pattern according to an embodiment of this application.
Figure 4:
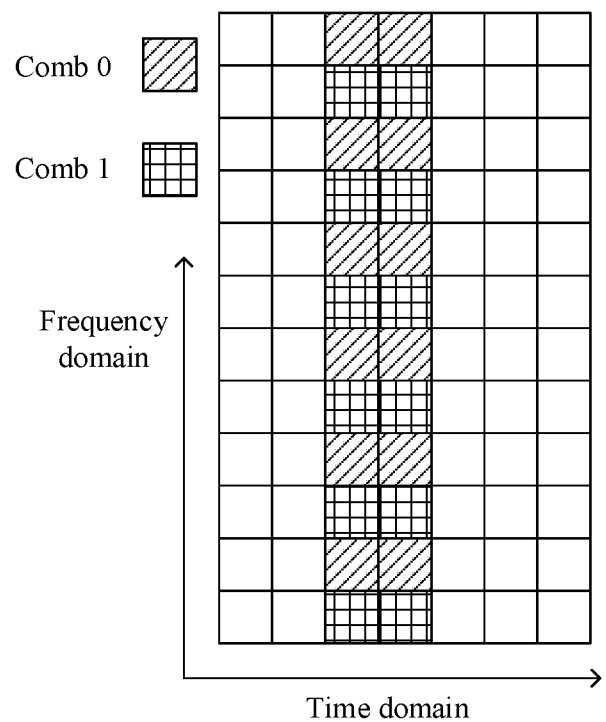
FIG. 4 is a schematic diagram of another DMRS pattern according to an embodiment of this application.
Figure 5:
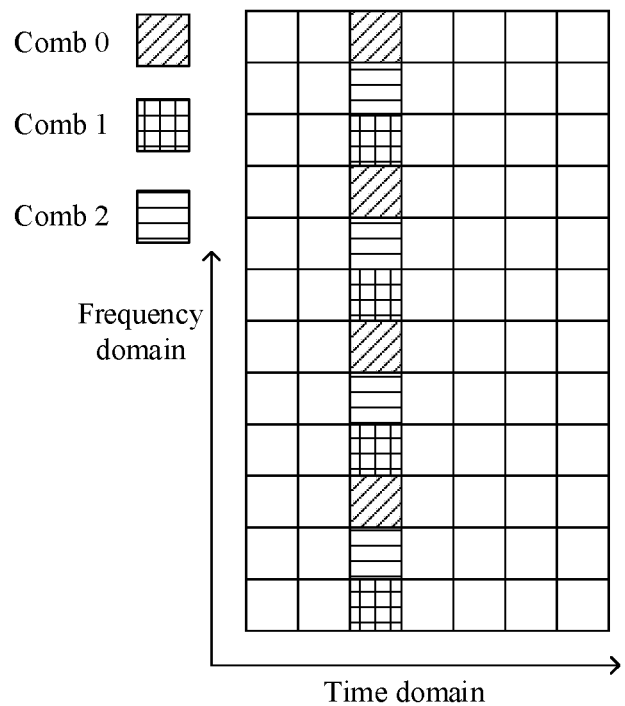
FIG. 5 is a schematic diagram of another DMRS pattern according to an embodiment of this application.
Figure 6:
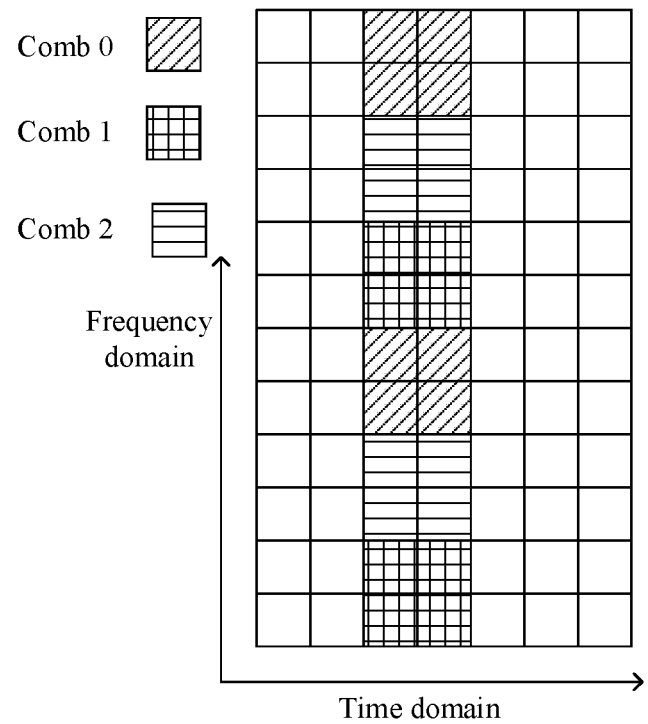
FIG. 6 is a schematic diagram of another DMRS pattern according to an embodiment of this application.

Specifically, two DMRS patterns are designed in the NR. FIG. 3 and FIG. 4 show DMRS patterns of DMRS configuration 1, and FIG. 5 and FIG. 6 show DMRS patterns of DMRS configuration 2. A maximum of 8 DMRS ports can be supported in the DMRS configuration 1, and a maximum of 12 DMRS ports can be supported in the DMRS configuration 2.

Optionally, in the DMRS configuration 1, as shown in FIG. 3, the DMRS can be supported on four DMRS ports. If the DMRS occupies one OFDM symbol, the DMRS may be arranged in frequency domain based on a comb structure (Comb). In other words, the DMRS ports may be distinguished by using a comb form in frequency domain. To be specific, one DMRS port is represented by Comb 0, and another DMRS port is represented by Comb 1. In addition, DMRS ports with a same comb structure identifier may be further distinguished by using a cyclic shift (CS) of a DMRS sequence. To be specific, comb identifiers of two DMRS ports each are Comb 0, and then the DMRS ports are further distinguished by using a CS $x_0$ or $x_1$. In this case, in this embodiment of this application, four types of DMRS ports may be distinguished by using the Comb and the CS, as shown in Table 4.

TABLE 4

| (Comb, CS) | Port number |
|---|---|
| (0, 0) | 0 |
| (0, 1) | 1 |
| (1, 0) | 2 |
| (1, 1) | 3 |

Optionally, in the DMRS configuration 1, as shown in FIG. 4, the DMRS can be supported on eight DMRS ports.

If the DMRS occupies two OFDM symbols, in addition to the foregoing manner in which the four types of DMRS ports are distinguished, two types of DMRS ports may be further distinguished based on a time-domain orthogonal cover code (TD-OCC) of the two DMRS symbols. In this case, in this embodiment of this application, eight types of DMRS ports may be distinguished by using the Comb, the CS and the TD-OCC, as shown in Table 5.

Figure 7:
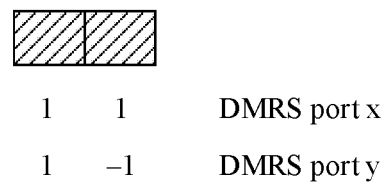
FIG. 7 is a schematic diagram of representation of a DMRS port according to an embodiment of this application.

For example, as shown in FIG. 7, a DMRS port x is represented by [1 1], and a DMRS port y is represented by [1 −1]. As shown in Table 5, the time-domain orthogonal code [1 1] of the two DMRS symbols is represented by a third number "1" in (0, 0, 1) in Table 5, and the time-domain orthogonal code [1 −1] of the two DMRS symbols is represented by a third number "0" in (0, 0, 0) in Table 5.

TABLE 5

| (Comb, CS, TD-OCC) | Port number |
|---|---|
| (0, 0, 0) | 0 |
| (0, 1, 0) | 1 |
| (1, 0, 0) | 2 |
| (1, 1, 0) | 3 |
| (0, 0, 1) | 4 |
| (0, 1, 1) | 5 |
| (1, 0, 1) | 6 |
| (1, 1, 1) | 7 |

Figure 8:
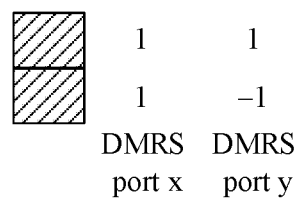
FIG. 8 is a schematic diagram of other representation of a DMRS port according to an embodiment of this application.

Optionally, in the DMRS configuration 2, two DMRS ports may be further distinguished based on a frequency-domain orthogonal code (Frequency Domain Orthogonal Cover Code, FD-OCC) of the two DMRS symbols. For example, as shown in FIG. 8, a DMRS port x is represented by using [1 1], and a DMRS port y is represented by using [1 −1]. To be specific, the frequency-domain orthogonal code [1 1] of the two DMRS symbols is represented by a second number "1" in (0, 1) in Table 6.

TABLE 6

| (Comb, FD-OCC) | Port number |
|---|---|
| (0, 0) | 0 |
| (0, 1) | 1 |
| (1, 0) | 2 |
| (1, 1) | 3 |
| (2, 0) | 4 |
| (2, 1) | 5 |

Optionally, in the DMRS configuration 2, the DMRS may be further used to distinguish two DMRS ports based on the time-domain orthogonal code and the frequency-domain orthogonal code of the two DMRS symbols. For example, the frequency-domain orthogonal code [1 1] of the two DMRS symbols is represented by a second number "0" in (0, 0, 1) in Table 7, and the time-domain orthogonal code [1 −1] of the two DMRS symbols is represented by a third number "0" in (0, 0, 0) in Table 7.

TABLE 7

| (Comb, FD-OCC, TD-OCC) | Port number |
|---|---|
| (0, 0, 0) | 0 |
| (0, 1, 0) | 1 |
| (1, 0, 0) | 2 |
| (1, 1, 0) | 3 |
| (0, 0, 1) | 4 |
| (0, 1, 1) | 5 |
| (1, 0, 1) | 6 |

TABLE 7-continued

| (Comb, FD-OCC, TD-OCC) | Port number |
|---|---|
| (1, 1, 1) | 7 |
| (2, 0, 0) | 8 |
| (2, 1, 0) | 9 |
| (2, 0, 1) | 10 |
| (2, 1, 1) | 11 |

Because both the CS and the FD-OCC are used to make DMRS sequences on different ports orthogonal in frequency domain, for convenience, a CS and an FD-OCC of a pilot sequence are collectively referred to as the frequency-domain orthogonal code.

Optionally, the network device may first determine the second set in the first set. In other words, some improper DMRS port combinations are limited. In this way, the network device may determine, based on the quantity of DMRS port combinations included in the second set, a quantity of bits that is included in first information and that indicates a DMRS port combination in the second set. This avoids a case in which bits are occupied to indicate some improper DMRS port combinations, thereby reducing signaling overheads.

Optionally, the DMRS port combinations included in the first set may be applicable to different scenarios, so that the network device may select a proper second set from the first set based on an application scenario.

For example, in the rank 2, (port 0, port 1) is suitable for single-station transmission, and (port 0, port 2) is suitable for multi-station transmission. Therefore, in this embodiment of this application, a second set that meets a requirement may be selected from the first set based on the application scenario.

For another example, if two DMRS ports are multiplexed in a frequency domain code division manner, the two DMRS ports are from a same station. If two stations simultaneously serve same user equipment, a frequency division multiplexing manner cannot be used for DMRSs from different stations. For example, the rank 2 in Table 5 is used as an example. If two stations serve a terminal device and each station sends a data layer, DMRS port combinations (0, 1), (2, 3), (4, 5), and (6, 7) cannot be used. If only one station serves a user, but an area covered by a cell has relatively large delay spread, in this case, the frequency division multiplexing manner is used for a DMRS port 0 and a DMRS port 1, and channel estimation performance is greatly affected by the delay spread. Similarly, (2, 3), (4, 5), and (6, 7) cannot be used. If a station works at a high frequency, phase noise causes channel changes within OFDM symbols. Therefore, a manner in which the TD-OCC is used to distinguish the DMRS port cannot be used neither. In this case, a single-symbol DMRS is not affected. However, for a dual-symbol DMRS, a DMRS port 0 and a DMRS port 4 are distinguished in a manner of using a TD-OCC, and therefore, the DMRS port 0 and the DMRS port 4 cannot be simultaneously used. To be specific, only one of [1 1] or [1 −1] can be used for ports distinguished in the manner of using the TD-OCC. As shown in Table 5, if DMRS ports 0, 1, 2, and 3 are used, DMRS ports 4, 5, 6, and 7 cannot be used any more.

Optionally, the network device may alternatively select, based on whether the MU is preferentially supported, and whether the TD-OCC is preferentially used in a low signal-to-noise ratio, or the like, the second set from the first set.

Optionally, the network device may determine, from the first set, a second set that is applicable to a non-collaborative scenario.

Specifically, as shown in Table 8, some DMRS port combinations that are not applicable to the non-coordinative scenario, for example, (0, 4, 5, 6, 7), may be excluded. In other words, a set formed by remaining DMRS port combinations is determined as the second set.

TABLE 8

| | | Rank 1 | Rank 2 | Rank 3 | Rank 4 | Rank 5 | Rank 6 | Rank 7 | Rank 8 |
|---|---|---|---|---|---|---|---|---|---|
| One OFDM symbol | 0 | | (0, 1) | (0, 1, 2) | (0, 1, 2, 3) | | | | |
| | 1 | | (2, 3) | (0, 1, 3) | | | | | |
| | 2 | | (0, 2) | (0, 2, 3) | | | | | |
| | 3 | | (1, 3) | (1, 2, 3) | | | | | |
| Two OFDM symbols | 0 | | (0, 1) | (0, 1, 2) | (0, 1, 2, 3) | (0, 1, 2, 3, 4) | (0, 1, 2, 3, 4, 5) | (0, . . . , 6) | (0, . . . , 7) |
| | 1 | | (2, 3) | (4, 5, 6) | (4, 5, 6, 7) | | | | |
| | 2 | | (4, 5) | (0, 2, 3) | | . . . | . . . | | |
| | 3 | | (6, 7) | (4, 6, 7) | | | | | |
| | 4 | | (0, 2) | | | . . . | | | |
| | 5 | | (4, 6) | | | | | | |
| | 6 | | (1, 3) | | . . . | | | | |
| | 7 | | (5, 7) | | | | | | |
| | | | . . . | | | | | | |

Optionally, the network device may determine, from the first set, a second set that is applicable to a low-latency scenario, as shown in Table 9.

TABLE 9

| | | Rank 1 | Rank 2 | Rank 3 | Rank 4 | Rank 5 | Rank 6 | Rank 7 | Rank 8 |
|---|---|---|---|---|---|---|---|---|---|
| One OFDM symbol | 0 | | (0, 1) | (0, 1, 2) | (0, 1, 2, 3) | | | | |
| | 1 | | (2, 3) | (0, 1, 3) | | | | | |
| | 2 | | (0, 2) | | | | | | |
| | 3 | | (1, 3) | | | | | | |
| Two OFDM symbols | 0 | | (0, 1) | (0, 1, 2) | (0, 1, 2, 3) | (0, 1, 2, 3, 4) | (0, 1, 2, 3, 4, 5) | (0, . . . , 6) | (0, . . . , 7) |
| | 1 | | (2, 3) | (4, 5, 6) | (4, 5, 6, 7) | | | | |
| | 2 | | (4, 5) | (0, 2, 3) | | . . . | . . . | | |
| | 3 | | (6, 7) | (4, 6, 7) | | | | | |
| | 4 | | | | | . . . | | | |
| | 5 | | (1, 3, 5) | | | | | | |
| | 6 | | (4, 6, 0) | | . . . | | | | |
| | 7 | | (5, 7, 1) | | | | | | |
| | | | (0, 4) | . . . | | | | | |
| | | | (1, 5) | | | | | | |
| | | | (2, 6) | | | | | | |
| | | | (3, 7) | | | | | | |
| | | | . . . | | | | | | |

Optionally, the network device may determine, from the first set, a second set that is applicable to a high-frequency scenario, which is shown in Table 10.

TABLE 10

|  |  | Rank 1 | Rank 2 | Rank 3 | Rank 4 | Rank 5 | Rank 6 | Rank 7 | Rank 8 |
|---|---|---|---|---|---|---|---|---|---|
| One OFDM symbol | 0 | 0 | (0, 1) | (0, 1, 2) | (0, 1, 2, 3) |  |  |  |  |
|  | 1 |  | (2, 3) | (0, 1, 3) |  |  |  |  |  |
|  | 2 |  | (0, 2) | (0, 2, 3) |  |  |  |  |  |
|  | 3 |  | (1, 3) | (1, 2, 3) |  |  |  |  |  |
| Two OFDM symbols | 0 | 0 | (0, 1) | (0, 1, 2) | (0, 1, 2, 3) |  |  |  |  |
|  | 1 |  | (2, 3) |  |  |  |  |  |  |
|  | 2 |  |  | (0, 2, 3) |  |  | ... | ... |  |
|  | 3 |  |  |  |  |  |  |  |  |
|  | 4 |  | (0, 2) |  |  |  |  |  |  |
|  | 5 |  |  |  |  |  |  |  |  |
|  | 6 |  | (1, 3) |  | ... |  |  |  |  |
|  | 7 |  |  |  |  |  |  |  |  |
|  |  |  | ... |  |  |  |  |  |  |

Optionally, if the network device needs to be applied to a non-coordinative station scenario, the low-latency scenario, and the high-frequency scenario, the network device may determine, as the second set, remaining DMRS port sets in Table 3 other than those limited in Table 8, Table 9, and Table 10, as shown in Table 11.

TABLE 11

|  |  | Rank 1 | Rank 2 | Rank 3 | Rank 4 | Rank 5 | Rank 6 | Rank 7 | Rank 8 |
|---|---|---|---|---|---|---|---|---|---|
| One OFDM symbol | 0 | 0 | (0, 1) | (0, 1, 2) | (0, 1, 2, 3) |  |  |  |  |
|  | 1 |  | (2, 3) |  |  |  |  |  |  |
| Two OFDM symbols | 0 | 0 | (0, 1) | (0, 1, 2) | (0, 1, 2, 3) |  |  |  |  |
|  | 1 |  | (2, 3) |  |  |  | ... | ... |  |
|  | 4 |  | (0, 2) |  | ... |  |  |  |  |
|  | 6 |  | (1, 3) |  | ... |  |  |  |  |
|  |  | ... |  |  |  |  |  |  |  |

Optionally, second information includes at least one bit, and a first bit value of each bit in the at least one bit is used to indicate that at least two DMRS port combinations in the first set belong to the second set. Each DMRS port in the at least two DMRS port combinations indicates that time-frequency resource locations occupied by the DMRS are the same, frequency-domain orthogonal codes occupied by the DMRS are the same, or time-domain orthogonal codes occupied by the DMRS are the same.

For example, as shown in Table 5, if the second information includes six bits,
  the first bit is used to indicate a group of ports (0, 1, 2, 3), and the group of ports occupy a same time-domain orthogonal code (TDD-OCC=0);
  the second bit is used to indicate a group of ports (4, 5, 6, 7), and the group of ports occupy a same time-domain orthogonal code (TDD-OCC=1);
  the third bit is used to indicate a group of ports (0, 1, 4, 5), and the group of ports occupy a same comb (Comb=0);
  the fourth bit is used to indicate a group of ports (2, 3, 6, 7), and the group of ports occupy a same comb (Comb=1);
  the fifth bit is used to indicate a group of ports (0, 2, 4, 6), and the group of ports have a same cyclic shift (CS=0); and
  the sixth bit is used to indicate a group of ports (1, 3, 5, 7), and the group of ports have a same cyclic shift (CS=1).

In other words, each bit indicates a group of ports. For example, [1 0 0 0 0 0] indicates a selected first group of ports, and a second set formed by the group of ports is shown in Table 12.

TABLE 12

| Rank 1 | Rank 2 | Rank 3 | Rank 4 |
|---|---|---|---|
| 0 | (0, 1) | (0, 1, 2) | (0, 1, 2, 3) |
| 1 | (2, 3) | (1, 2, 3) |  |
| 2 | (0, 2) |  |  |
| 3 | (1, 3) |  |  |

For another example, two DMRS ports form a group, as shown in Table 5, if the second information includes 12 bits,
  a DMRS port 0 and a DMRS port 1 (0, 1) occupy a same time-domain orthogonal code (TDD-OCC=0) and a same comb (comb=0);
  a DMRS port 2 and a DMRS port 3 (2, 3) occupy a same time-domain orthogonal code (TDD-OCC=0) and a same comb (comb=1);
  a DMRS port 4 and a DMRS port 5 (4, 5) occupy a same time-domain orthogonal code (TDD-OCC=1) and a same comb (comb=0);
  a DMRS port 6 and a DMRS port 7 (6, 7) occupy a same time-domain orthogonal code (TDD-OCC=1) and a same comb (comb=1);
  the DMRS port 0 and the DMRS port 2 (0, 2) occupy a same time-domain orthogonal code (TDD-OCC=0) and a same frequency-domain orthogonal code (CS=0);
  the DMRS port 1 and the DMRS port 3 (1, 3) occupy a same time-domain orthogonal code (TDD-OCC=0) and a same frequency-domain orthogonal code (CS=1);
  the DMRS port 4 and the DMRS port 6 (4, 6) occupy a same time-domain orthogonal code (TDD-OCC=1) and a same frequency-domain orthogonal code (CS=0);
  the DMRS port 5 and the DMRS port 7 (5, 7) occupy a same time-domain orthogonal code (TDD-OCC=1) and a same frequency-domain orthogonal code (CS=1);
  the DMRS port 0 and the DMRS port 2 (0, 4) occupy a same time-domain orthogonal code (TDD-OCC=0) and a same frequency-domain orthogonal code (CS=0);
  the DMRS port 1 and the DMRS port 3 (1, 5) occupy a same comb (comb=0) and a same frequency-domain orthogonal code (CS=1);
  the DMRS port 4 and the DMRS port 6 (4, 6) occupy a same time-domain orthogonal code (TDD-OCC=1) and a same frequency-domain orthogonal code (CS=0); and
  the DMRS port 5 and the DMRS port 7 (5, 7) occupy a same time-domain orthogonal code (TDD-OCC=1) and a same frequency-domain orthogonal code (CS=1).

In this way, if bits included in the second information are [1 0 0 0 1 0 0 0 0 0 0 0], the first bit of 1 may be used to determine that the following DMRS port combinations in the first set belong to the second set, as shown in Table 13.

TABLE 13

| Rank 1 | Rank 2 |
|---|---|
| 0 | (0, 1) |
| 1 |  |

The following DMRS port combinations corresponding to the second bit of 1 belong to the second set, as shown in Table 14.

TABLE 14

| Rank 1 | Rank 2 |
|---|---|
| 0 | (0, 2) |
| 2 | |

Therefore, if bits included in the second information are [1 0 0 0 1 0 0 0 0 0 0], the second set includes all the DMRS port combinations in Table 13 and Table 14, as shown in Table 15.

TABLE 15

| Rank 1 | Rank 2 | Rank 3 |
|---|---|---|
| 0 | (0, 1) | (0, 1, 2) |
| 1 | (0, 2) | |
| 2 | | |

202. The network device sends the first information to the terminal device. Correspondingly, the terminal device receives the first information.

Optionally, the first information may be carried by using dynamic signaling, for example, terminal-specific downlink control information, or may be carried by using higher layer signaling, for example, radio resource control (RRC) signaling or media access control (MAC) layer signaling.

203. The terminal device determines a first DMRS port combination in the second set based on the first information.

In this case, the network device can determine the first DMRS port combination in the second set based on the first information, to receive data based on the first DMRS port combination. Because a quantity of bits occupied by the first information can indicate each DMRS port combination included in the second set, compared with that the first information is used to indicate a quantity of bits occupied by each DMRS port combination included in the first set, resource overheads are reduced.

For example, as shown in Table 11, the second set includes 16 DMRS port combinations, so that the first information may include 4 bits. In other words, values of the 4 bits may indicate any one of 16 DMRS port combinations.

Optionally, the terminal device may determine the DMRS port combination in the second set based on a protocol agreement.

Optionally, the terminal device may further receive second information sent by the network device, where the second information is used to indicate all the DMRS port combinations included in the second set.

Optionally, the second information may include at least one bit, and each bit in the at least one bit is corresponding to one DMRS port combination in the first set; and each bit value is used to indicate whether a DMRS port combination corresponding to each bit belongs to the second set.

Optionally, a first bit value of each bit in the at least one bit included in the second information may indicate that the DMRS port combination corresponding to each bit belongs to the second set. A second bit value of each bit in the at least one bit may indicate that the DMRS port combination corresponding to each bit does not belong to the second set.

For example, the first bit value is "1", and the second bit value is "0". If a bit is "1", a DMRS port combination corresponding to the bit belongs to the second set. In other words, the DMRS port combination does not belong to a limited DMRS port combination. If the bit is "0", the DMRS port combination corresponding to the bit does not belong to the second set.

As shown in Table 11, the network device may indicate, by using a bitmap (bitmap), the DMRS port combination included in the second set, for example, Rank 1: [1 1 0 0 1 1 0 0 1 0 1], Rank 2: [1 1 0 0 1 1 0 0 1 0 1 0 0 0 0 0], Rank 3: [1 0 0 0 1 0 0 . . . 0], Rank 4: [1 1 0 0 . . . 0], and Rank 5: [0 0 0 0 . . . 0].

It should be understood that, the first bit value may alternatively be "0", and the second bit value is "1". This is not limited in this application. For ease of description, an example in which the first bit value is "1" and the second bit value is "0" is used for description in the following embodiment.

Optionally, a first bit value of at least one bit in the at least one bit included in the second information may indicate that at least two DMRS port combinations in the first set belong to the second set.

Optionally, the second information includes three bits. The first bit is corresponding to a plurality of DMRS port combinations applied to the non-collaborative scenario, the second bit is corresponding to a plurality of DMRS port combinations applied to the low-latency scenario, and the third bit is corresponding to a plurality of DMRS port combinations applied to the high-frequency scenario. In this case, the network device may determine, based on each bit value, whether a plurality of DMRS port combinations corresponding to each bit belong to the second set.

For example, if the bitmap is [0 0 1], the first bit of "0" indicates that the plurality of DMRS port combinations in the second set are applied to a collaborative scenario, the second bit of "0" indicates that the plurality of DMRS port combinations in the second set are applied to a high-low-latency scenario, and the third bit of "1" indicates that the plurality of DMRS port combinations in the second set are applied to the high-frequency scenario. In this way, the second set includes remaining DMRS port combinations in Table 10. If the bitmap is [1 0 0], the second set includes remaining DMRS port combinations in Table 8. If the bitmap is [0 1 0], the second set includes remaining DMRS port combinations in Table 9. If the bitmap is [1 1 1], the second set includes remaining DMRS port combinations in Table 11.

It should be understood that a sequence of the three bits is not limited in this embodiment of this application.

Optionally, after receiving the first information, the terminal device may determine, based on the first information, the DMRS port combination, and determine, based on the DMRS port combination and the foregoing Table 4 to Table 7, a frequency domain location used to transmit the DMRS and the frequency-domain orthogonal code of the DMRS, or a frequency domain location used to transmit the DMRS, and the frequency-domain orthogonal code and the time-domain orthogonal code of the DMRS. Therefore, the terminal device can accurately demodulate received data.

Optionally, the DMRS port combination may be represented by using a DMRS port number.

It should be noted that, each DMRS port is corresponding to one DMRS port number. In this case, one DMRS port combination may be corresponding to one DMRS port number combination. In other words, the DMRS port number combination is formed by a plurality of DMRS port numbers.

Optionally, a value of a bit included in the first information includes two bit values indicating a same first DMRS port combination, and the first DMRS port combination indicates a first time-frequency resource location; a first bit value in the two bit values further indicates that some or all time-frequency resources other than the first time-frequency resource location in a second time-frequency resource are used for the terminal device to transmit data, and a second bit value in the two bit values further indicates that the some or all time-frequency resources other than the first time-frequency resource location in the second time-frequency resource are not used for the terminal device to transmit data; and a frequency domain resource of the second time-frequency resource is bandwidth allocated by the network device to the terminal device, and a time domain resource of the second time-frequency resource is a time unit occupied by the DMRS.

Specifically, the network device sends the first information, a value of at least one bit included in the first information includes two bit values indicating a same DMRS port combination, and an example in which the same DMRS port combination is the first DMRS port combination is used for description. If the first DMRS port combination indicates the first time-frequency resource location, the value of the bit included in the first information is further used to indicate whether the time-frequency resource other than the first time-frequency resource location is used to transmit data.

It should be understood that, the time unit may be one OFDM symbol, or may be two OFDM symbols.

For example, it is assumed that port combinations included in the second set are shown in Table 16.

TABLE 16

|  | Rank 1 | Rank 2 | Rank 3 | Rank 4 |
|---|---|---|---|---|
| One OFDM symbol | 0 | (0, 1) | (0, 1, 2) | (0, 1, 2, 3) |
|  | 1 | (2, 3) | (0, 1, 3) |  |
|  | 2 |  |  |  |
|  | 3 |  |  |  |

In other words, the second set includes nine DMRS port combinations. To be specific, the first information may include four bits, and a correspondence between the value of the bit included in the first information and the DMRS port combination is shown in Table 17.

TABLE 17

| Bit value | DMRS port combination | Rank |
|---|---|---|
| 0 | 0 | 1 |
| 1 | 1 | 1 |
| 2 | 2 | 1 |
| 3 | 3 | 1 |
| 4 | (0, 1) | 2 |
| 5 | (2, 3) | 2 |
| 6 | (2, 1, 0) | 3 |
| 7 | (3, 1, 0) | 3 |
| 8 | (0, 1, 2, 3) | 4 |
| 9-15 | Reserved | Reserved |

As shown in FIG. 3 and Table 4, a DMRS port 0 and a DMRS port 1 indicate a time-frequency resource corresponding to the comb 0, and a DMRS port 2 and a DMRS port 3 indicate a time-frequency resource corresponding to the comb 1. For the terminal device, if the rank=1 or the rank=2 and the port is (0, 1) or (2, 3), the DMRS occupies a same comb. Another comb may be used for the terminal device to transmit data or by another terminal device other than the terminal device to transmit the DMRS. In this embodiment of this application, the value of the bit included in the first information may be used to indicate whether a comb that is not occupied for the terminal device can be used to transmit the data of the terminal device.

For example, as shown in Table 18, in this embodiment of this application, a reserved state shown in Table 17 may be fully used, and therefore, the value of the bit included in the first information includes two bit values indicating a same DMRS port combination. To be specific, a bit value 0 and a bit value 1 each indicate a DMRS port combination 0. A time-frequency resource location indicated by the DMRS port combination is the time-frequency resource location corresponding to the comb 0, and a first bit value of the two bit values further indicates that another time-frequency resource location other than the first time-frequency resource location is used for the terminal device to transmit the data, a second bit value of the two bit values further indicates that the another time-frequency resource location other than the first time-frequency resource location is not used for the terminal device to transmit the data, for example, may be used to transmit a DMRS of the another terminal device.

TABLE 18

| Bit value | DMRS port combination | Rank | Can a comb be used to transmit data or not? |
|---|---|---|---|
| 0 | 0 | 1 | A comb 1 is used to transmit data. |
| 1 | 0 | 1 | A comb 1 is not used to transmit data. |
| 2 | 1 | 1 | A comb 1 is used to transmit data. |
| 3 | 1 | 1 | A comb 1 is not used to transmit data. |
| 4 | 2 | 1 | A comb 0 is used to transmit data. |
| 5 | 2 | 1 | A comb 0 is not used to transmit data. |
| 6 | 3 | 1 | A comb 0 is used to transmit data. |
| 7 | 3 | 1 | A comb 0 is not used to transmit data. |
| 8 | (0, 1) | 2 | A comb 1 is used to transmit data. |
| 9 | (0, 1) | 2 | A comb 1 is not used to transmit data. |
| 10 | (2, 3) | 2 | A comb 0 is used to transmit data. |
| 11 | (2, 3) | 2 | A comb 0 is not used to transmit data. |
| 12 | (0, 1, 2) | 3 | N/A |
| 13 | (0, 1, 3) | 3 | N/A |
| 14 | (0, 1, 2, 3) | 4 | N/A |
| 15 | Reserved | Reserved | Reserved |

It should be understood that, if rank=3 or rank=4, the time-frequency resource indicated by the DMRS port combination includes time-frequency resource locations corresponding to the comb 0 and the comb 1. In other words, both the time-frequency resource location corresponding to the comb 0 and the time-frequency resource location corresponding to the comb 1 may be used to transmit the DMRS.

It should be understood that, in this embodiment of this application, time domain resources occupied by the comb 0 and the comb 1 may be one OFDM symbol or two OFDM symbols, and this may be determined by a time domain resource occupied by the DMRS. This is not limited in this embodiment of this application.

For another example, four different values of the bit included in the first information may be corresponding to a same DMRS port 0, and two values in the four bit values are used to indicate whether the comb 1 is used to transmit data, and the other two values are used to indicate whether the comb 2 is used to transmit data.

Optionally, if the time-frequency resource location other than the first time-frequency resource location may be used to transmit data of the terminal device, the data and the DMRS to be transmitted by using the first time-frequency resource may be simultaneously transmitted.

Figure 9:
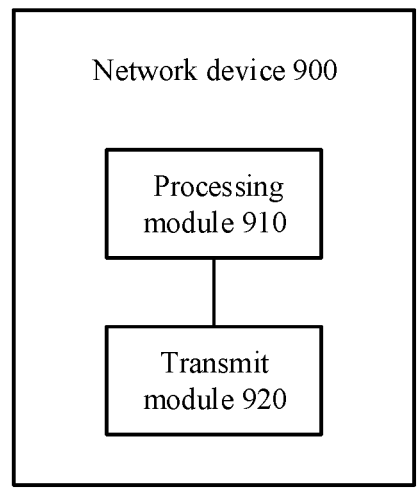
FIG. 9 is a schematic block diagram of a network device according to an embodiment of this application.

FIG. 9 is a schematic block diagram of a network device 900 according to an embodiment of this application. As shown in FIG. 9, the network device 900 includes:

a processing module 910, configured to generate first information, and a value of a bit included in the first information is used to indicate a demodulation reference symbol DMRS port combination in a second set, each DMRS port combination in the second set belongs to a first set, the first set includes a plurality of DMRS port combinations, and a quantity of DMRS port combinations included in the second set is less than a quantity of DMRS port combinations included in the first set; and a transmit module 920, configured to send the first information to a terminal device.

Optionally, the transmit module 920 is further configured to:

send second information to the terminal device, where the second information is used for the terminal device to determine all DMRS port combinations included in the second set.

The second information includes at least one bit, and a first bit value of each bit in the at least one bit is used to indicate that at least two DMRS port combinations in the first set belong to the second set.

Optionally, each DMRS port combination in the at least two DMRS port combinations indicates that time-frequency resource locations occupied by DMRSs are the same, frequency-domain orthogonal codes occupied by DMRSs are the same, or time-domain orthogonal codes occupied by DMRSs are the same.

Optionally, the second information includes the at least one bit, and each bit in the at least one bit is corresponding to one DMRS port combination in the first set; and a first bit value of each bit is used to indicate whether the DMRS port combination corresponding to each bit belongs to the second set.

Optionally, the value of the bit included in the first information includes two bit values indicating a same first DMRS port combination, and the first DMRS port combination indicates a first time-frequency resource location; a first bit value in the two bit values further indicates that some or all time-frequency resources other than the first time-frequency resource location in a second time-frequency resource are used for the terminal device to transmit data, and a second bit value in the two bit values further indicates that the some or all time-frequency resources other than the first time-frequency resource location in the second time-frequency resource are not used for the terminal device to transmit the data; and a frequency domain resource of the second time-frequency resource is bandwidth allocated by the network device to the terminal device, and a time domain resource of the second time-frequency resource is a time unit occupied by the DMRS.

Optionally, the DMRS port is used to indicate a frequency domain resource location and the frequency-domain orthogonal code that are occupied by the DMRS, or indicates a frequency domain resource location, the frequency-domain orthogonal code, and the time-domain orthogonal code that are occupied by the DMRS.

Therefore, in this embodiment of this application, the network device can determine a first DMRS port combination in the second set based on the first information, to receive data based on the first DMRS port combination. Compared with a case in which the first information is used to indicate a quantity of bits occupied by each DMRS port combination included in the first set, because a quantity of bits occupied by the first information can indicate each DMRS port combination included in the second set, resource overheads are reduced.

It should be understood that, the network device 900 in this embodiment of this application may be corresponding to the network device in the data transmission method in the embodiment in FIG. 2, and the foregoing management operations and/or functions and other management operations and/or functions of modules of the network device 900 are intended to implement corresponding steps of the foregoing methods. For brevity, details are not described herein again.

Figure 10:
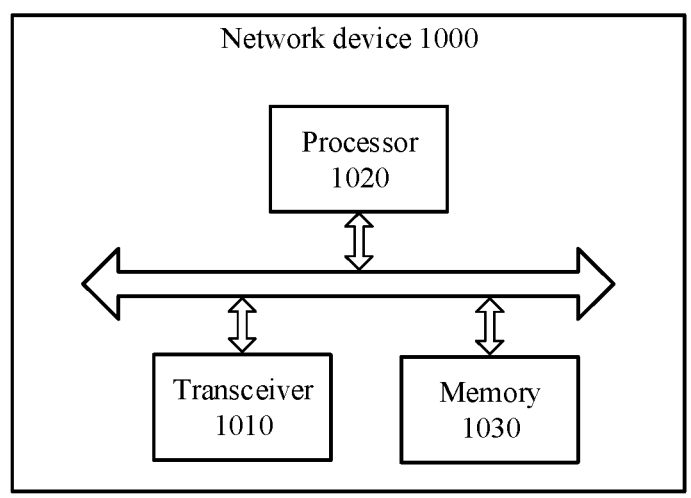
FIG. 10 is a schematic structural diagram of a network device according to an embodiment of this application.

In this embodiment of this application, the transmit module 910 and the receive module 920 may be implemented by a transceiver. As shown in FIG. 10, a network device 1000 may include a transceiver 1010, a processor 1020, and a memory 1030. The memory 1030 may be configured to store indication information, and may be further configured to store code, an instruction, and the like that are executable by the processor 1020.

Figure 11:
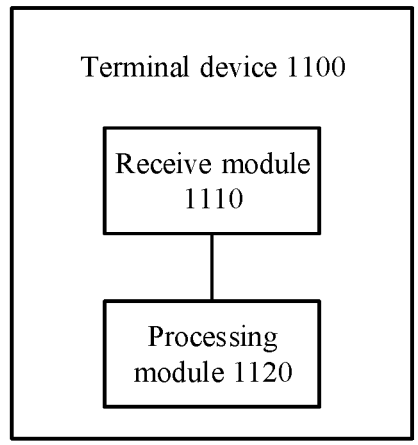
FIG. 11 is a schematic block diagram of a terminal device according to an embodiment of this application.

FIG. 11 is a schematic block diagram of a terminal device 1100 according to an embodiment of this application. As shown in FIG. 11, the terminal device 1100 includes:

a receive module 1110, configured to generate first information, and a value of a bit included in the first information is used to indicate a demodulation reference symbol DMRS port combination in a second set, each DMRS port combination in the second set belongs to a first set, the first set includes a plurality of DMRS port combinations, and a quantity of DMRS port combinations included in the second set is less than a quantity of DMRS port combinations included in the first set; and a determining module 1120, configured to determine a first DMRS port combination in the second set based on the first information.

Optionally, the receive module 1110 is further configured to:

receive second information, where the second information is used for the terminal device to determine all DMRS port combinations included in the second set.

Optionally, the second information includes at least one bit, and a first bit value of each bit in the at least one bit is used to indicate that at least two DMRS port combinations in the first set belong to the second set.

Optionally, each DMRS port combination in the at least two DMRS port combinations indicates that time-frequency resource locations occupied by DMRSs are the same, frequency-domain orthogonal codes occupied by DMRSs are the same, or time-domain orthogonal codes occupied by DMRSs are the same.

Optionally, the second information includes the at least one bit, and each bit in the at least one bit is corresponding to one DMRS port combination in the first set, and a first bit value of each bit is used to indicate whether the DMRS port combination corresponding to each bit belongs to the second set.

Optionally, the value of the bit included in the first information includes two bit values indicating a same first DMRS port combination, and the first DMRS port combination indicates a first time-frequency resource location; a first bit value in the two bit values further indicates that some or all time-frequency resources other than the first time-frequency resource location in a second time-frequency resource are used for the terminal device to transmit data; a second bit value in the two bit values further indicates that the some or all time-frequency resources other than the first time-frequency resource location in the second time-frequency resource are not used for the terminal device to transmit the data; and a frequency domain resource of the second time-frequency resource is bandwidth allocated by the network device to the terminal device, and a time domain resource of the second time-frequency resource is a time unit occupied by the DMRS.

Optionally, the DMRS port is used to indicate a frequency domain resource location and the frequency-domain orthogonal code that are occupied by the DMRS, or indicates a frequency domain resource location, the frequency-domain orthogonal code, and the time-domain orthogonal code that are occupied by the DMRS.

Therefore, in this embodiment of this application, the terminal device 1100 can obtain the first DMRS port combination in the second set based on the first information, to send data based on the first DMRS port combination. Compared with a case in which the first information is used to indicate a quantity of bits occupied by each DMRS port combination included in the first set, because a quantity of bits occupied by the first information can indicate each DMRS port combination included in the second set, resource overheads are reduced.

It should be understood that, the terminal device 1100 in this embodiment of this application may be corresponding to the terminal device in a method 500 for resource allocation in the embodiments of this application, and the foregoing management operations and/or functions and other management operations and/or functions of modules of the terminal device 1100 are intended to implement corresponding steps of the foregoing methods. For brevity, details are not described herein again.

Figure 12:
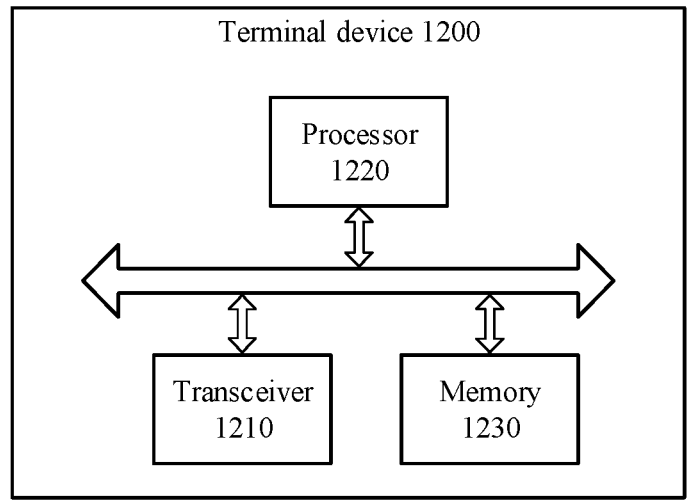
FIG. 12 is a schematic structural diagram of a terminal device according to an embodiment of this application.

The receive module 1110 in this embodiment of this application may be implemented by a transceiver, and a processing module 1120 may be implemented by a processor. As shown in FIG. 12, a terminal device 1200 may include a transceiver 1210, a processor 1220, and a memory 1230. The memory 1230 may be configured to store indication information, and may be further configured to store code, an instruction, and the like that are to be executed by the processor 1220.

It should be understood that, the processor 1020 or the processor 1220 may be an integrated circuit chip and has a signal processing capability. In an implementation process, steps in the foregoing method embodiments can be implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of the present invention. The general-purpose processor may be a microprocessor, or the processor may alternatively be any conventional processor, or the like. Steps of the methods disclosed with reference to the embodiments of the present invention may be directly executed by using a hardware decoding processor, or may be executed by using a combination of hardware and software modules in a decoding processor. The software module may be located in a mature storage medium in the art, such as a random access memory, a flash memory, a read-only memory, a programmable read-only memory, an electrically erasable programmable memory, a register. The storage medium is located in the memory, and the processor reads information from the memory and completes the steps in the foregoing methods in combination with hardware of the processor.

It may be understood that, the memory 1030 or the memory 1230 in the embodiments of the present invention may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM).

It should be noted that, the memory of the systems and methods described in this specification includes but is not limited to these and any memory of another proper type.

Figure 13:
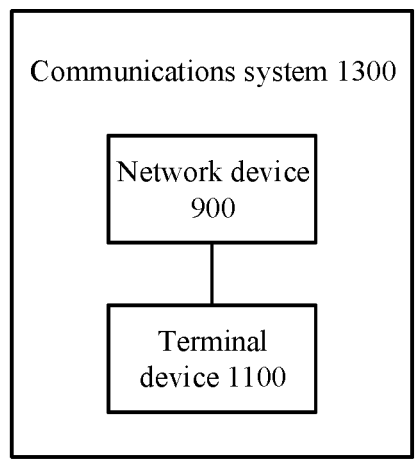
FIG. 13 is a schematic block diagram of a communications system according to an embodiment of this application.

FIG. 13 shows a communications system 1300 according to an embodiment of this application. The communications system 1300 includes:

the network device 900 in the embodiment shown in FIG. 9 and the terminal device 1100 in the embodiment shown in FIG. 11.

An embodiment of this application further provides a computer storage medium, and the computer storage medium may store a program instruction for indicating any of the foregoing methods.

An embodiment of this application further provides a system chip. The system chip includes an input/output interface, at least one processor, at least one memory, and a bus. The at least one memory is configured to store an instruction, and the at least one processor is configured to invoke the instruction in the at least one memory, to perform operations in the methods according to the foregoing embodiments.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that such implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that, the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
receiving, by a terminal device, first information, wherein a bit value of a bit of the first information is used to indicate a demodulation reference symbol (DMRS) port combination in a second set, each DMRS port combination in the second set belongs to a first set, the first set comprises a plurality of DMRS port combinations, each DMRS port combination in the plurality of DMRS port combinations comprises at least one DMRS port, and a quantity of DMRS port combinations in the second set is less than a quantity of DMRS port combinations in the first set; and determining, by the terminal device, a first DMRS port combination in the second set based on the first information.

2. The method according to claim 1, wherein before the receiving, the method further comprises:
receiving, by the terminal device, second information, wherein the second information is used by the terminal device to determine the DMRS port combinations included in the second set.

3. The method according to claim 2, wherein the second information comprises at least one bit, and a first bit value of the second information is used to indicate that at least two DMRS port combinations in the first set belong to the second set.

4. The method according to claim 3, wherein each DMRS port combination in the at least two DMRS port combinations indicates that:
time-frequency resource locations occupied by DMRSs are the same,
frequency-domain orthogonal codes occupied by DMRSs are the same, or
time-domain orthogonal codes occupied by DMRSs are the same.

5. The method according to claim 2, wherein:
each bit value of the second information corresponds to one DMRS port combination in the first set; and
each bit value is used to indicate whether the DMRS port combination corresponding to the bit value belongs to the second set.

6. The method according to claim 1, wherein:
two bit values of the bit of the first information each indicate the first DMRS port combination, and the first DMRS port combination indicates a first time-frequency resource location;
a first bit value in the two bit values further indicates that some or all time-frequency resources in a second time-frequency resource are used for the terminal device to transmit data, and a second bit value in the two bit values further indicates that some or all time-frequency resources in the second time-frequency resource are not used for the terminal device to transmit data; and
a frequency domain resource of the second time-frequency resource is bandwidth allocated by the network device to the terminal device, and a time domain resource of the second time-frequency resource is a time unit occupied by the DMRS.

7. The method according to claim 1, wherein the at least one DMRS port is used to indicate:
the time-frequency resource locations and the frequency-domain orthogonal code that are occupied by the DMRS, or
the time-frequency resource locations, the frequency-domain orthogonal code, and the time-domain orthogonal code that are occupied by the DMRS.

8. A communications apparatus, comprising:
a memory, configured to store a computer program; and
a processor, configured to execute the computer program stored in the memory, so that the apparatus performs the method according to claim 1.

9. A non-transitory computer readable storage medium, comprising a computer program, wherein when the computer program runs on a processor, the processor performs the method according to claim 1.

10. A communications chip, wherein the communications chip stores an instruction, and when the instruction runs on the communications chip, the communications chip performs the method according to claim 1.

11. A terminal device, comprising:
a receiver, configured to receive first information, wherein a bit value of a bit of the first information is used to indicate a demodulation reference symbol (DMRS) port combination in a second set, each DMRS port combination in the second set belongs to a first set, the first set comprises a plurality of DMRS port combinations, each DMRS port combination in the plurality of DMRS port combinations comprises at least one DMRS port, and a quantity of DMRS port combinations in the second set is less than a quantity of DMRS port combinations in the first set; and a processor, configured to determine a first DMRS port combination in the second set based on the first information.

12. The terminal device according to claim 11, wherein the receiver is further configured to:
receive second information, wherein the second information is used by the terminal device to determine the DMRS port combinations included in the second set.

13. The terminal device according to claim 12, wherein the second information comprises at least one bit, and a first bit value of the second information is used to indicate that at least two DMRS port combinations in the first set belong to the second set.

14. The terminal device according to claim 13, wherein each DMRS port combination in the at least two DMRS port combinations indicates:
that time-frequency resource locations occupied by DMRSs are the same,
frequency-domain orthogonal codes occupied by DMRSs are the same, or
time-domain orthogonal codes occupied by DMRSs are the same.

15. The terminal device according to claim 12, wherein:
each bit value of the second information corresponds to one DMRS port combination in the first set, and
each bit value is used to indicate whether the DMRS port combination corresponding to the bit value belongs to the second set.

16. The terminal device according to claim 11, wherein:
two bit values of the bit of the first information each indicate the first DMRS port combination, and the first DMRS port combination indicates a first time-frequency resource location;
a first bit value in the two bit values further indicates that some or all time-frequency resource locations in a second time-frequency resource are used for the terminal device to transmit data;
a second bit value in the two bit values further indicates that the some or all time-frequency resource locations in the second time-frequency resource are not used for the terminal device to transmit data; and
a frequency domain resource of the second time-frequency resource is bandwidth allocated by the network device to the terminal device, and a time domain resource of the second time-frequency resource is a time unit occupied by the DMRS.

17. The terminal device according to claim 11, wherein the at least one DMRS port is used to indicate:
a frequency domain resource location and the frequency-domain orthogonal code that are occupied by the DMRS, or
a frequency domain resource location, the frequency-domain orthogonal code, and the time-domain orthogonal code that are occupied by the DMRS.

18. A network device, comprising:
a processor, configured to generate first information, wherein a value of a bit comprised in the first information is used to indicate a demodulation reference symbol (DMRS) port combination in a second set, each DMRS port combination in the second set belongs to a first set, the first set comprises a plurality of DMRS port combinations, each DMRS port combination in the plurality of DMRS port combinations comprises at least one DMRS port, and a quantity of DMRS port combinations in the second set is less than a quantity of DMRS port combinations in the first set; and
a transceiver, configured to send the first information to a terminal device.

19. The network device according to claim 18, wherein the transceiver is further configured to:
send second information to the terminal device, wherein the second information is used by the terminal device to determine the DMRS port combinations included in the second set.

* * * * *